(12) United States Patent
Bai

(10) Patent No.: US 10,387,706 B2
(45) Date of Patent: Aug. 20, 2019

(54) ULTRASONIC TRANSDUCER OF ULTRASONIC FINGERPRINT SENSOR AND MANUFACTURING METHOD THEREOF

(71) Applicant: NANCHANG O-FILM BIO-IDENTIFICATION TECHNOLOGY CO., LTD., Nanchang (CN)

(72) Inventor: Anpeng Bai, Nanchang (CN)

(73) Assignee: NANCHANG O-FILM BIO-IDENTIFICATION TECHNOLOGY CO., LTD., Nanchang (CN)

(*) Notice: Subject to any disclaimer, the term of this patent is extended or adjusted under 35 U.S.C. 154(b) by 123 days.

(21) Appl. No.: 15/489,837

(22) Filed: Apr. 18, 2017

(65) Prior Publication Data

US 2018/0068146 A1 Mar. 8, 2018

(30) Foreign Application Priority Data

Sep. 5, 2016 (CN) .......................... 2016 1 0801759
Sep. 5, 2016 (CN) ...................... 2016 2 1037786 U

(51) Int. Cl.
*G06K 9/00* (2006.01)
*B06B 1/06* (2006.01)

(52) U.S. Cl.
CPC .......... *G06K 9/0002* (2013.01); *B06B 1/0629* (2013.01); *G06K 9/00053* (2013.01)

(58) Field of Classification Search
None
See application file for complete search history.

(56) References Cited

U.S. PATENT DOCUMENTS

| 9,613,246 | B1* | 4/2017 | Gozzini | G06K 9/0002 |
| 2007/0126315 | A1* | 6/2007 | Scott | G06K 9/0002 310/318 |
| 2014/0219521 | A1* | 8/2014 | Schmitt | G06K 9/0002 382/124 |
| 2014/0352440 | A1* | 12/2014 | Fennell | G01N 29/22 73/632 |
| 2017/0364726 | A1* | 12/2017 | Buchan | G06K 9/0002 |

FOREIGN PATENT DOCUMENTS

WO    WO-2017183879 A1 * 10/2017 ............. G02B 21/00

* cited by examiner

*Primary Examiner* — Vu Le
*Assistant Examiner* — Tracy Mangialaschi
(74) *Attorney, Agent, or Firm* — Hodgson Russ LLP

(57) ABSTRACT

The present disclosure discloses an ultrasonic transducer and a manufacturing method. The ultrasonic transducer for an ultrasonic fingerprint sensor comprises a piezoelectric layer, receiving electrode lines, emitting electrode lines, a substrate, connecting electrodes and bonding wires. Wherein the piezoelectric layer comprises an array of piezoelectric pillars. The plurality of receiving electrode lines are formed on the piezoelectric layer. The plurality of emitting electrode lines being formed beneath the piezoelectric layer. The substrate is formed under the emitting electrode lines. The connecting electrodes are formed under the substrate. The bonding wires are configured to connect the receiving electrode lines with the connecting electrodes and to connect the emitting electrode lines with the connecting electrodes.

15 Claims, 19 Drawing Sheets

ULTRASONIC TRANSDUCER OF ULTRASONIC FINGERPRINT SENSOR AND MANUFACTURING METHOD THEREOF

CROSS-REFERENCE TO RELATED APPLICATION

This application claims priority to and the benefit of Chinese Patent Application Nos. 201610801759.9 and 201621037786.5, both filed with the State Intellectual Property Office of P. R. China on Sep. 5, 2016. The entire contents of the above-identified applications are incorporated herein by reference.

FIELD

Embodiments of the present disclosure relate to sensor technology, and more particularly to an ultrasonic transducer of a sensor and a manufacturing method of the ultrasonic transducer.

BACKGROUND

In the related art, for manufacturing an ultrasonic transducer of an ultrasonic fingerprint sensor, connecting electrodes are formed on a periphery of a bottom surface of a piezoelectric layer of the ultrasonic transducer and each of the connecting electrodes is connected to a corresponding pixel of the ultrasonic transducer formed in the piezoelectric layer, and the ultrasonic transducer is typically bonded to the circuit board using an anisotropic conductive film (ACF) to form the ultrasonic fingerprint sensor (i.e., package). However, as a pixel density increasing with technology development, a density of the connecting electrodes correspondingly increases, and pitches between the connecting electrodes become such small that short circuit may happen to the connecting electrodes when the ultrasonic transducer is bonded to the circuit board using the ACF, degrade quality of the ultrasonic fingerprint sensor.

SUMMARY

Embodiments of the present disclosure seek to solve at least one of the problems existing in the prior art to at least some extent.

Embodiments of a broad aspect of the present disclosure provide an ultrasonic transducer of an ultrasonic fingerprint sensor. The ultrasonic transducer of a sensor, according to embodiments of the present disclosure comprises: a piezoelectric layer, wherein the piezoelectric layer comprises an array of piezoelectric pillars; a plurality of receiving electrode lines being formed on the piezoelectric layer, each of the receiving electrode lines being configured to connect to a corresponding column of the piezoelectric pillars; a plurality of emitting electrode lines being formed beneath the piezoelectric layer, each of the emitting electrode lines being configured to connected to a corresponding row of the piezoelectric pillars; a substrate being configured to carry the emitting electrode lines, the piezoelectric layer and the receiving electrode lines; connecting electrodes formed on the substrate, opposite to the emitting electrode lines; and bonding wires configured to connect the receiving electrode lines with the connecting electrodes and to connect the emitting electrode lines with the connecting electrodes.

In some embodiments of the present disclosure, the piezoelectric layer further comprises fillers being configured to fill the gaps formed between the plurality of piezoelectric pillars.

In some embodiments of the present disclosure, the fillers comprise epoxy glues.

In some embodiments of the present disclosure, each of the piezoelectric pillars has a rectangular cross-section with a width of 30 microns and a height of 70-80 microns.

In some embodiments of the present disclosure, the thickness of the receiving electrode lines is 2.5 microns and/or the thickness of the emitting electrode lines is 2.5 microns.

In some embodiments of the present disclosure, the substrate comprises glass.

In some embodiments of the present disclosure, the thickness of the substrate is 100-300 microns.

In some embodiments of the present disclosure, the ultrasonic transducer further comprises at least one of the following parts: an upper protective layer configured to cover the receiving electrode lines; a lower protective layer configured to cover the emitting electrode lines, wherein the lower protective layer configured to bond to the substrate.

In some embodiments of the present disclosure, the bonding wires comprise: coating sections configured to cover the connecting electrodes; and interconnecting sections configured to connect the coating sections with the receiving electrode lines and to connect the coating sections with the emitting electrode lines.

In some embodiments of the present disclosure, the ultrasonic transducer further comprises at least one of the following parts: a protective layer configured to cover the interconnecting sections; solder balls configured to cover the coating sections.

Embodiments of another broad aspect of the present disclosure provide a manufacturing method of an ultrasonic transducer of an ultrasonic fingerprint sensor. The manufacturing method comprising: forming a piezoelectric layer, wherein the piezoelectric layer comprises an array of piezoelectric pillars; forming a plurality of receiving electrode lines on the piezoelectric layer, each of the receiving electrode lines being configured to connect to a corresponding column of the piezoelectric pillars; forming a plurality of emitting electrode lines beneath the piezoelectric layer, each of the emitting electrode lines being configured to connected to a corresponding row of the piezoelectric pillars; bonding a substrate beneath the emitting electrode lines; forming connecting electrodes on the substrate, opposite to the emitting electrode lines; forming bonding wires to connect the receiving electrode lines with the connecting electrodes and to connect the emitting electrode lines with the connecting electrodes.

In some embodiments of the present disclosure, the manufacturing method further comprises one of the following steps: forming an upper protective layer to cover the receiving electrode lines; forming a lower protective layer to cover the emitting electrode lines, wherein the lower protective layer configured to bond to the substrate.

In some embodiments of the present disclosure, the step of forming connecting electrodes on the opposite side to the emitting electrode lines of the substrate further comprises: forming a metal layer on the opposite side to emitting electrode lines of the substrate; and forming connecting electrodes corresponding to the receiving electrode lines and the emitting electrode lines respectively on the metal layer.

In some embodiments of the present disclosure, the manufacturing method further comprises: forming holes from top to bottom at the piezoelectric pillars connected to one end of the receiving electrode lines to guide the receiving electrode lines to pass through the piezoelectric pillars and forming receiving electrode line contacts beneath the piezoelectric pillars.

In some embodiments of the present disclosure, the step of forming bonding wires to connect the receiving electrode lines with the connecting electrodes and to connect the emitting electrode lines with the connecting electrodes further comprises: cutting the substrate from bottom to top on the side with receiving electrode line contacts to the bottom of the piezoelectric pillars with receiving line contacts to form a first cutting surface; and forming the bonding wires to cover the connecting electrodes and the first cutting surface so that to connect the connecting electrodes with the receiving line contacts.

In some embodiments of the present disclosure, the manufacturing method further comprising: forming emitting electrode line contacts at the piezoelectric pillars connected with one end of the emitting electrode lines.

In some embodiments of the present disclosure, the step of forming bonding wires to connect the receiving electrode lines with the connecting electrodes and to connect the emitting electrode lines with the connecting electrodes further comprises: cutting the substrate from bottom to top on the side with emitting electrode line contacts to the bottom of the piezoelectric pillars with emitting electrode line contacts to form a second cutting surface; and forming the bonding wires to cover the connecting electrodes and the second cutting surface so that to connect the connecting electrodes with the receiving line contacts.

With the ultrasonic transducer and the manufacturing method according to embodiments of the present disclosure, the receiving electrode lines and emitting electrode lines are guided to the bottom surface of the substrate by bonding wires, the contact area of connecting electrodes is increased by the connecting electrodes, such that, in the packaging process of the ultrasonic fingerprint sensor, the ultrasonic transducer of a sensor is easier to be bonded to the circuit board accurately with the connecting electrodes and bonding wires, and the manufacturing for the ultrasonic transducer of a sensor with small spacing of the connecting electrodes and high resolution may be accomplished.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
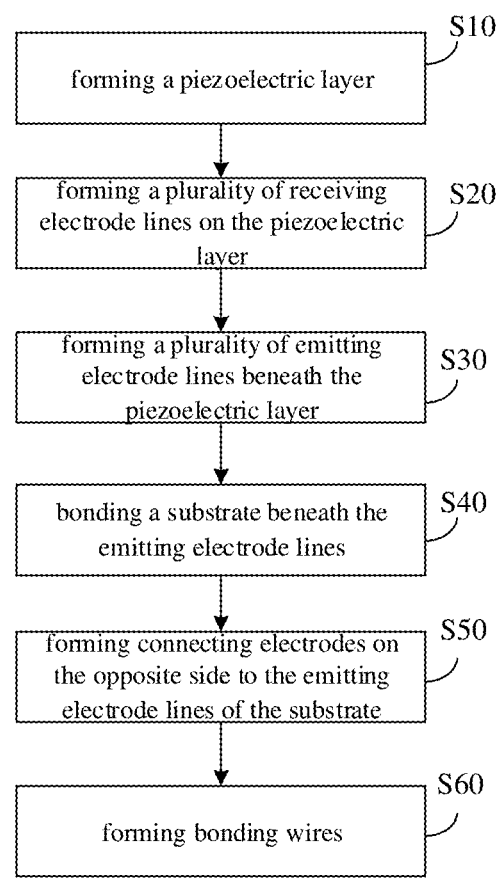
FIG. 1 is a schematic flow chart of an exemplary manufacturing method of an ultrasonic transducer according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, it should be understood that the terms such as "central", "longitudinal", "lateral", "width", "thickness", "above", "below", "front", "rear", "right", "left", "vertical", "horizontal", "top", "bottom", "inner", "outer", "clockwise", "counter-clockwise" should be construed to refer to the orientation as then described or as shown in the drawings. These terms are merely for convenience and concision of description and do not alone indicate or imply that the device or element referred to must have a particular orientation. Thus, it cannot be understood to limit the present disclosure.

In addition, terms such as "first" and "second" are used herein for purposes of description and are not intended to indicate or imply relative importance or significance or impliedly indicate quantity of the technical feature referred to. Thus, the feature formed with "first" and "second" may comprise one or more of these features. In the description of the present disclosure, "a plurality of" means two or more than two of these features, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

An ultrasonic transducer of a sensor and a manufacturing method, according to embodiments of the present disclosure, may be described below with reference to FIGS. 1-24.

In some embodiments, as shown in FIG. 1, the manufacturing method of an ultrasonic transducer of a sensor of an ultrasonic fingerprint sensor comprises:

S10: forming a piezoelectric layer, wherein the piezoelectric layer comprises a plurality of piezoelectric pillars arranged in an array;

S20: forming a plurality of receiving electrode lines on the piezoelectric layer, each of the receiving electrode lines being configured to connect to a corresponding column of the piezoelectric pillars;

S30: forming a plurality of emitting electrode lines beneath the piezoelectric layer, each of the emitting electrode lines being configured to connected to a corresponding row of the piezoelectric pillars;

S40: bonding a substrate beneath the emitting electrode lines;

S50: forming connecting electrodes on the opposite side to the emitting electrode lines of the substrate;

S60: forming bonding wires to connect the receiving electrode lines with the connecting electrodes and to connect the emitting electrode lines with the connecting electrodes.

Figure 2:
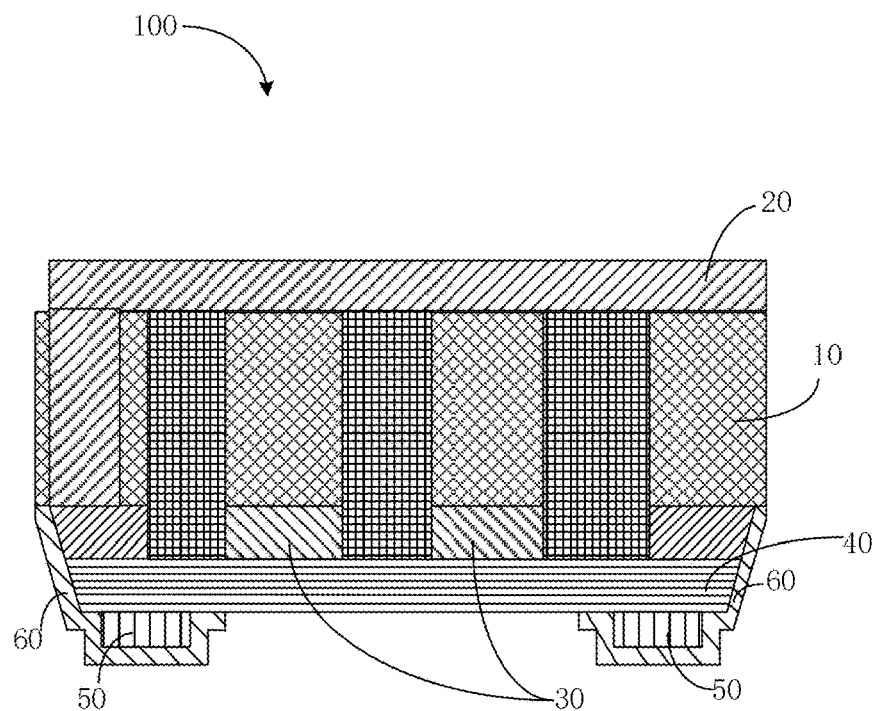
FIG. 2 is a schematic cross section view of an exemplary ultrasonic transducer according to an embodiment of the present disclosure.

In an embodiment of the present disclosure, as shown in FIG. 2, an ultrasonic transducer 100 for an ultrasonic fingerprint sensor comprises: a piezoelectric layer 10, a plurality of receiving electrode lines 20, a plurality of emitting electrode lines 30, a substrate 40, a plurality of connecting electrodes 50 and a plurality of electroplated bonding wires 60. The piezoelectric layer 10 comprises a plurality of piezoelectric pillars 12 arranged in an array. The plurality of receiving electrode lines 20 are being formed on the piezoelectric layer 10 and each of the receiving electrode lines 20 is configured to connect to a corresponding column of the piezoelectric pillars 12. The plurality of emitting electrode lines 30 are being formed beneath the piezoelectric layer 10 and each of the emitting electrode lines 30 is configured to connect to a corresponding row of the piezoelectric pillars 12. The substrate 40 is configured to carry the emitting electrode lines 30, the piezoelectric layer 10 and the receiving electrode lines 20. The connecting electrodes 50 are being formed on the opposite side to the emitting electrode lines 30 of the substrate 40. The bonding wires 60 are configured to connect the receiving electrode lines 20 with the connecting electrodes 50 and to connect the emitting electrode lines 30 with the connecting electrodes 50.

The manufacturing method of the embodiment of the present disclosure can be used for manufacturing the ultrasonic transducer 100 according to the embodiment of the present disclosure.

With the ultrasonic transducer 100 of a sensor and the manufacturing method thereof provided in embodiments of the present disclosure, the receiving electrode lines 20 and emitting electrode lines 30 are guided to the bottom surface of the substrate 40 by bonding wires 60, the contact area of connecting electrodes is increased by the connecting electrodes 50, such that, in the packaging process of the ultrasonic fingerprint sensor, the ultrasonic transducer 100 is easier to connect to the circuit board accurately with the connecting electrodes 50 and bonding wires 60, and the manufacturing for the ultrasonic transducer 100 with small spacing of the connecting electrodes and high resolution may be accomplished The manufacturing process and the structure will be described below in detail with a single fingerprint transducer 100 as an example.

Figure 3:
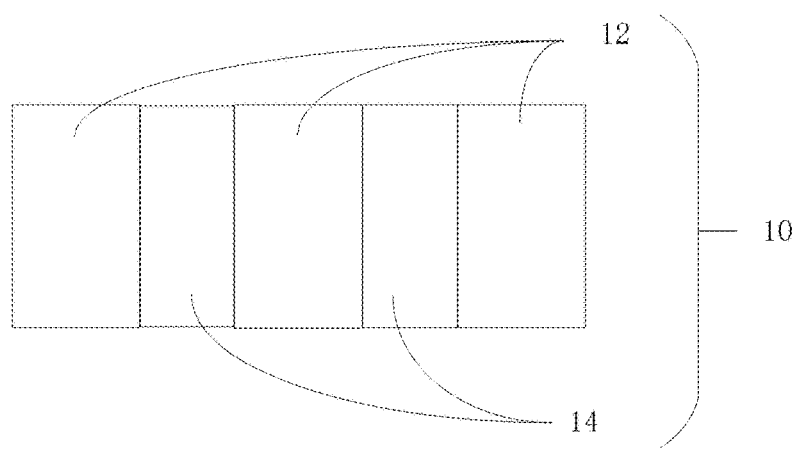
FIG. 3 is a schematic side view of an exemplary piezoelectric layer according to an embodiment of the present disclosure.
Figure 4:
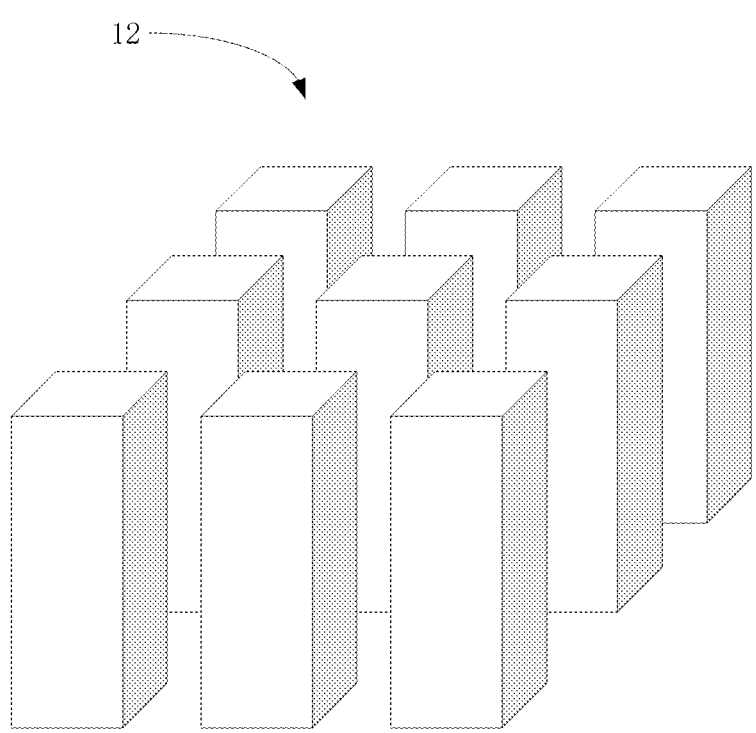
FIG. 4 is a schematic stereoscopic view of an exemplary piezoelectric pillars according to an embodiment of the present disclosure.
Figure 5:
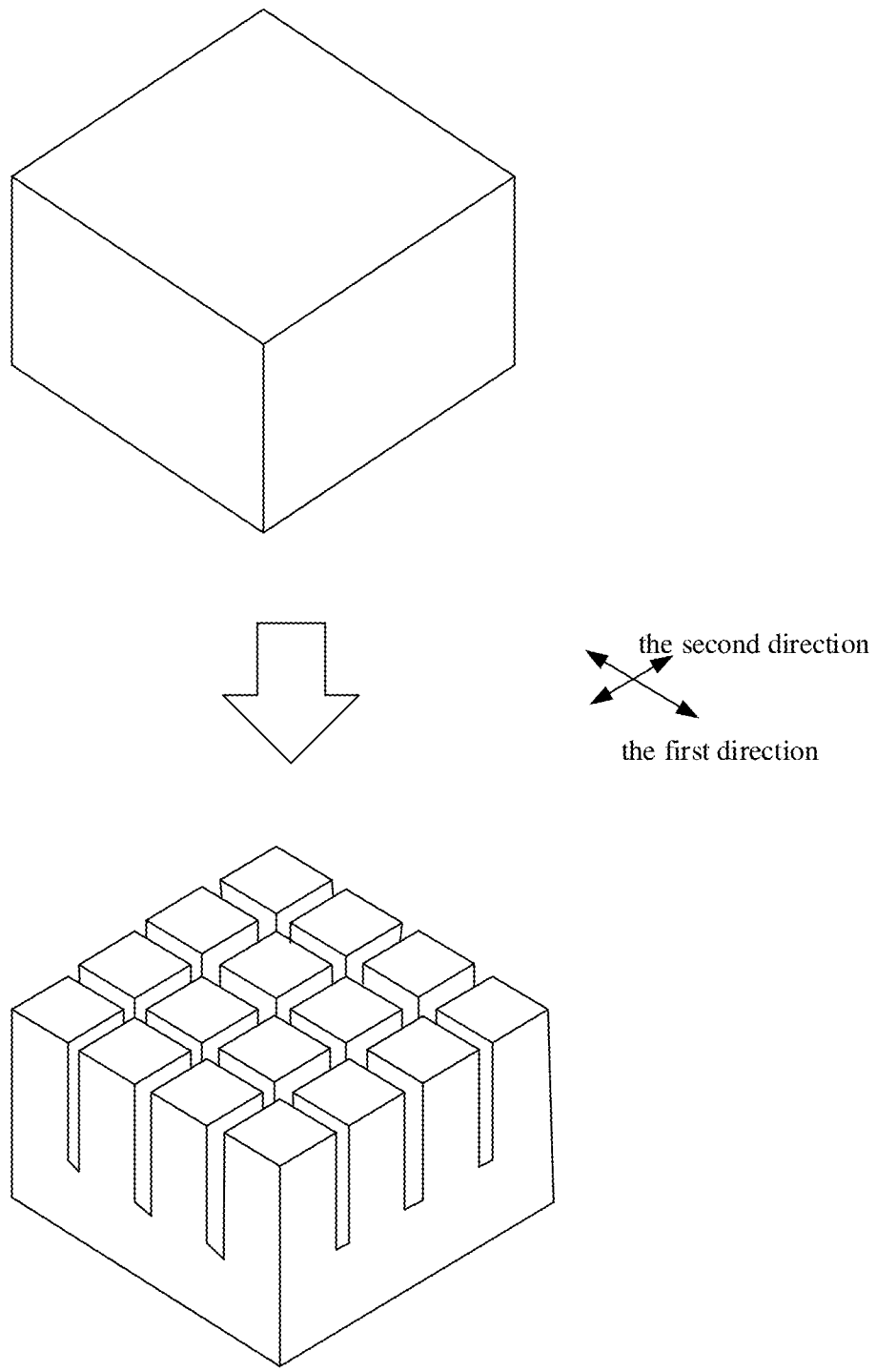
FIG. 5 is a schematic view of an exemplary manufacturing process of a piezoelectric layer according to an embodiment of the present disclosure.

In detail, as shown in FIGS. 3-5, in some embodiments of the present disclosure, the piezoelectric layer 10 comprises a plurality of piezoelectric pillars 12 arranged in an array and fillers 14, wherein the fillers 14 are configured to fill the gaps formed between the plurality of piezoelectric pillars 12.

In some embodiments of present disclosure, the piezoelectric layer 10 may be made of piezoelectric material, such as piezoelectric ceramics. The piezoelectric pillars 12 may be formed through cutting a block of piezoelectric material. In some embodiments, the formed piezoelectric pillars 12 is arranged in an array, such as a matrix. The matrix array of the piezoelectric pillars 12 is easy to manufacture and the cost of manufacturing can be reduced. In detail, taking the rectangular array as an example, in the process, the piezoelectric material may be cut in a first direction by using a cutting device with a certain thickness and the cutting operation is repeated until the cutting in the first direction is completed according to the design requirements of the number of the piezoelectric pillars 12.

In detail, the thickness of the cutting device is the gap between the formed piezoelectric pillars 12, and the depth of the cutting is the height of the piezoelectric pillars 12. The appropriate dimensions of the gap and the height can generally be selected according to the design requirements of the ultrasonic transducer 100.

Preferably, in some embodiments, the dimension of gap may be 50 microns to meet the requirements of the sampling resolution of the ultrasonic transducer 100, such as the resolution is greater than 508 DPI (Dots per Inch). When the dimension of the gap is larger than 50 microns, the sampling resolution will be reduced, the transmitted and the received signal will become weak, and thus cannot identify the fingerprint accurately.

It should be noted that, the piezoelectric material should be thicker than the piezoelectric pillars 12 to facilitate the process of manufacturing. In other words, cutting the material according to the size requirement of the piezoelectric pillars 12, and bottom of the material should be keep continuous.

A second direction cutting which is different from the first direction is necessary in order to form piezoelectric pillars 12 arranged in a matrix array after the first direction cutting, the second direction may be perpendicular to the first direction as an example. Similarly, to the first direction cutting, the second direction cutting should meet the design requirements and the inter-pillar gap of the piezoelectric pillars 12. After the second direction cutting, the piezoelectric material comprises an upper portion which comprises a plurality of piezoelectric pillars 12 formed by cutting, and a continuous lower portion.

Such that, a plurality of piezoelectric pillars 12 can be cut according to the design requirements.

In detail, in some embodiments of the present disclosure, each of the piezoelectric pillars 12 has a rectangular cross-section with a width of 30 microns and a height of 70-80 microns.

Such that, the piezoelectric pillars 12 can meet the requirements of the ultrasonic transducer 100 for a high sampling resolution, such as higher than 508 DPI. Certainly, the dimensions of the piezoelectric pillars 12 will be different in different designs.

As shown in FIG. 3, further, the continuous lower portion of the piezoelectric material after the two directions cutting is surplus and needs to be removed. If the removing operation is continued on the material, the piezoelectric pillars 12 will be dispersed and the piezoelectric layer 10 cannot be formed. Therefore, the gap between the piezoelectric pillars 12 formed after the two directions should be filled with the fillers 14 before the following cutting operation.

Such that, the plurality of the piezoelectric pillars 12 may be viscously connected, and the surplus of the material may be removed to form the piezoelectric layer 10.

In some embodiments of the present disclosure, the filler 14 may be epoxy glues, such as epoxy resin glues. The epoxy resin glues are an insulation material, which has a good temperature resistance, a good solubility, and a strong bonding ability and also has a bright surface after curing.

Such that, the plurality of piezoelectric pillars 12 can be bonding well by the epoxy glues, so that the piezoelectric layer 10 is formed as a good mechanical property.

In addition, the fillers 14 may be other materials with non-conductive and non-piezoelectric with same, and it is not limited.

Figure 6:
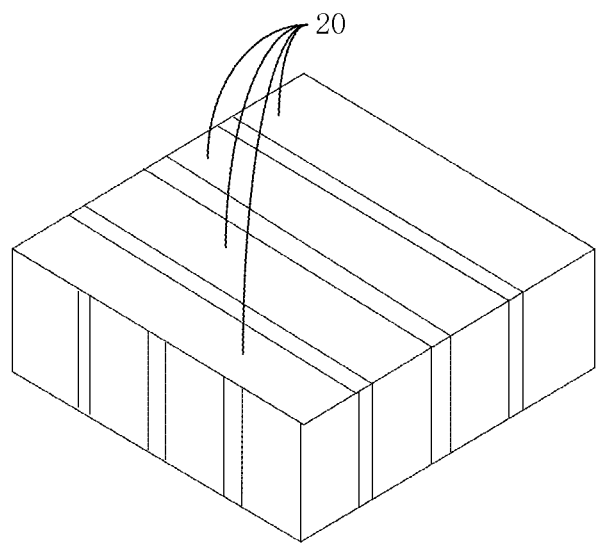
FIG. 6 is a schematic view of an exemplary manufacturing process of emitting electrode lines and receiving electrode lines according to an embodiment of the present disclosure.
Figure 6:
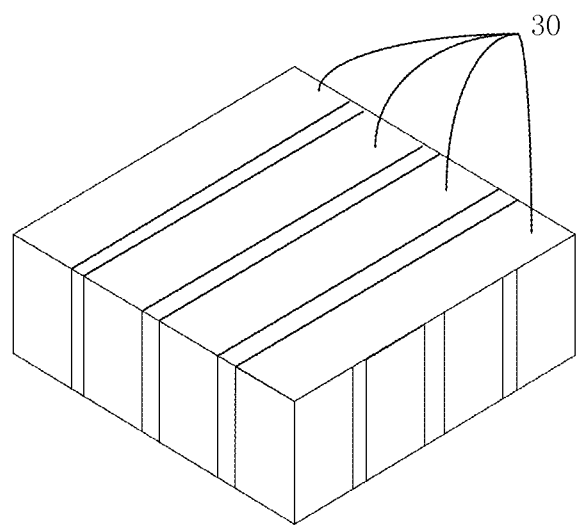

As shown in FIG. 6, further, after the piezoelectric layer 10 is formed, the manufacturing process of the electrode lines will be operated on the upper surface and the lower surface of the piezoelectric layer 10.

In detail, in some embodiments, the upper and lower electrode lines may be formed by the sputtering process.

The sputtering process uses electrons or high-energy lasers to bombard the target and spit the surface components of the target in atomic or ionic form and eventually precipitate on a substrate surface, undergoes a film formation process, and finally form a film.

Preferably, in some embodiments, selecting silver as the target, the receiving electrode lines 20 being formed on the piezoelectric layer 10 and the emitting electrode lines 30 being formed beneath the piezoelectric layer 10 by the sputtering process.

In detail, in some embodiments, the thickness of the receiving electrode lines 20 and the emitting electrode lines 30 are both 2.5 microns.

Such that, it can make the thickness of the receiving electrode lines 20 and the emitting electrode lines 30 meets the process requirements to ensure a good electrical property of lines.

In detail, when the piezoelectric pillars 12 are arranged in a matrix of m*n, a receiving electrode line 20 is formed on the upper surface of each column of the piezoelectric pillars 12, in other words, n receiving electrode lines 20 will be formed on the piezoelectric layer 10. And an emitting electrode line 30 is formed on the lower surface of each row of the piezoelectric pillars 12, in other words, m emitting electrode lines 30 will be formed beneath the piezoelectric layer 10.

It should be noted that, the receiving electrode lines 20 and the emitting electrode lines 30 should be intersected, in other words, the receiving electrode line 20 and the emitting electrode lines 30 cannot be arranged in parallel, for example, they may be arranged vertically.

Such that, the receiving electrode lines 20 and the emitting electrode lines 30 intersect each other and can be configured to transmit and receive signals when an object approaches or contacts with the piezoelectric layer 10.

In detail, the receiving electrode lines 20 and the emitting electrode lines 30 are configured to receive and transmit ultrasonic signals. When a finger is close to or in contact with the piezoelectric layer 10, the piezoelectric material is deformed. And ultrasonic signal will be generated when the frequency of the deformation is greater than the acoustic, such as 10-20 MHz. The ultrasonic signal is transmitted by the emitting electrode lines 30 in the direction of the finger, and the ultrasonic signal reflected by the finger will be received by the receiving electrode lines 20. Furthermore, the fingerprint sensor can identify the fingerprint according to the difference between the transmitted and received signals.

In more detail, when a voltage with a resonant frequency in the ultrasonic frequency band is externally applied to the emitting electrode lines 30 and the receiving electrode lines 20 formed on the opposite sides of the piezoelectric layer 10, the ultrasonic signal will be generated by the piezoelectric layer 10.

With respect to the ultrasonic signal, when the finger does not come into contact with or approach to the piezoelectric layer 10, most of the ultrasonic signal transmitted from the emitting electrode lines will return to the receiving electrode lines 20 rather than pass through the interface between the piezoelectric layer 10 and the air due to the difference in acoustic impedance between the air and the piezoelectric layer 10.

In the meantime, when the finger approaches or contacts the piezoelectric layer 10, a portion of the ultrasound signal transmitted from the emitting electrode lines passes through the interface between the skin of finger and the piezoelectric layer 10 into the finger. As a result, the intensity of the reflected and returned signal is reduced, so that a fingerprint pattern can be detected.

Although it is difficult to identify a fingerprint pattern with the naked eye for a user, the fingerprint may have a plurality of patterns with repeated ridge lines and valley lines. When the ridge lines and the valley lines are repeated, the height between the ridge lines and the valley lines will change. Thus, the piezoelectric layer 10 does not come into direct contact with the skin at the valley lines of the fingerprint, but can be in direct contact with the skin at the ridge lines of the fingerprint.

Therefore, the ultrasonic signal transmitted from the emitting electrode lines 30 of the piezoelectric layer 10 corresponding to the valley lines of the fingerprint is transmitted to the outside, and most of the ultrasound signal is reflected toward the inside and received by the receiving electrode lines 20. While, the ultrasonic signal transmitted from the emitting electrode lines 30 of the piezoelectric layer 10 corresponding to the ridge lines of the fingerprint passes through the boundary of the finger and is reflected so that the intensity of the ultrasonic signal received by the receiving electrode lines 20 is remarkably reduced.

Such that, the fingerprint pattern can be detected by measuring the intensity or the reflection coefficient of the ultrasonic signal according to the valley lines and the ridge lines on the piezoelectric layer 10. The reflection and reception of the ultrasonic signal is due to the difference in acoustic impedance.

Figure 7:
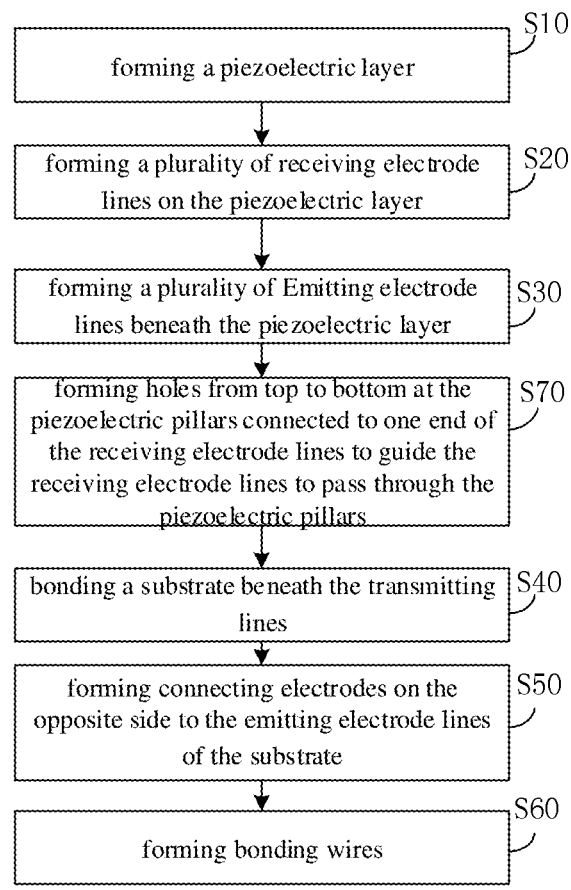
FIG. 7 is a schematic flow chart of an exemplary manufacturing method of an ultrasonic transducer according to another embodiment of the present disclosure.

As shown in FIG. 7, further, for the subsequent packing process, the receiving electrode lines 20 on the piezoelectric layer 10 should be guided beneath the piezoelectric layer 10. In some embodiments, the manufacturing method further comprises:

S70: forming holes from top to bottom at the piezoelectric pillars connected to one end of the receiving electrode lines to guide the receiving electrode lines to pass through the piezoelectric pillars.

Figure 8:
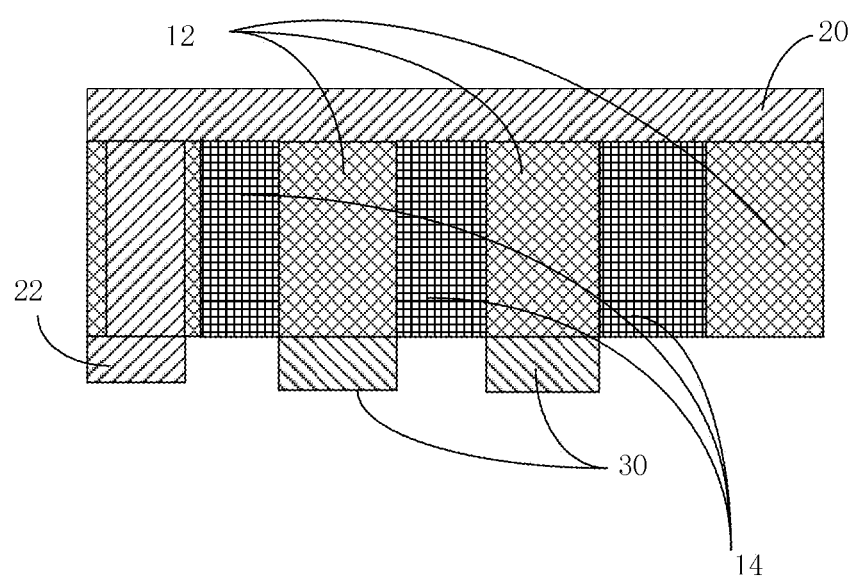
FIG. 8 is a schematic view of an exemplary manufacturing process of receiving electrode line contacts according to an embodiment of the present disclosure.

As shown in FIG. 8, in the specific manufacturing process, the holes may be formed at a predetermined position on the uncut piezoelectric material according to the design requirements, which is easier to operate compared to form the holes after the completion of the cutting of the piezoelectric pillars 12. The holes may also be formed after cutting the piezoelectric pillars 12, and this is not limited thereto.

It should be noted that, each receiving electrode line 20 is only need to expose from one side of the piezoelectric pillars, in other words, only one end of each receiving electrode line 20 is selected as a contact. The piezoelectric pillars 12 which are being formed holes may be selected according to the positions of contacts actually designed in the process of forming the holes. For example, the piezoelectric pillars 12 on the opposite sides of the matrix can be selected to be configured to form the holes. In another example, the piezoelectric pillars 12 can be on the same side of the matrix.

In detail, the holes are being formed by the electroplating silver process, so that the receiving electrode lines 20 on the piezoelectric layer 10 can be guided to the lower surface of the piezoelectric layer 10 through the holes, and receiving electrode line contacts 22 are being formed beneath the piezoelectric pillars 12.

In should be noted that, emitting electrode lines 30 are not be provided beneath the one or two rows of the piezoelectric pillars which are forming the holes to prevent the short circuit due to the connection of lines.

Figure 9:
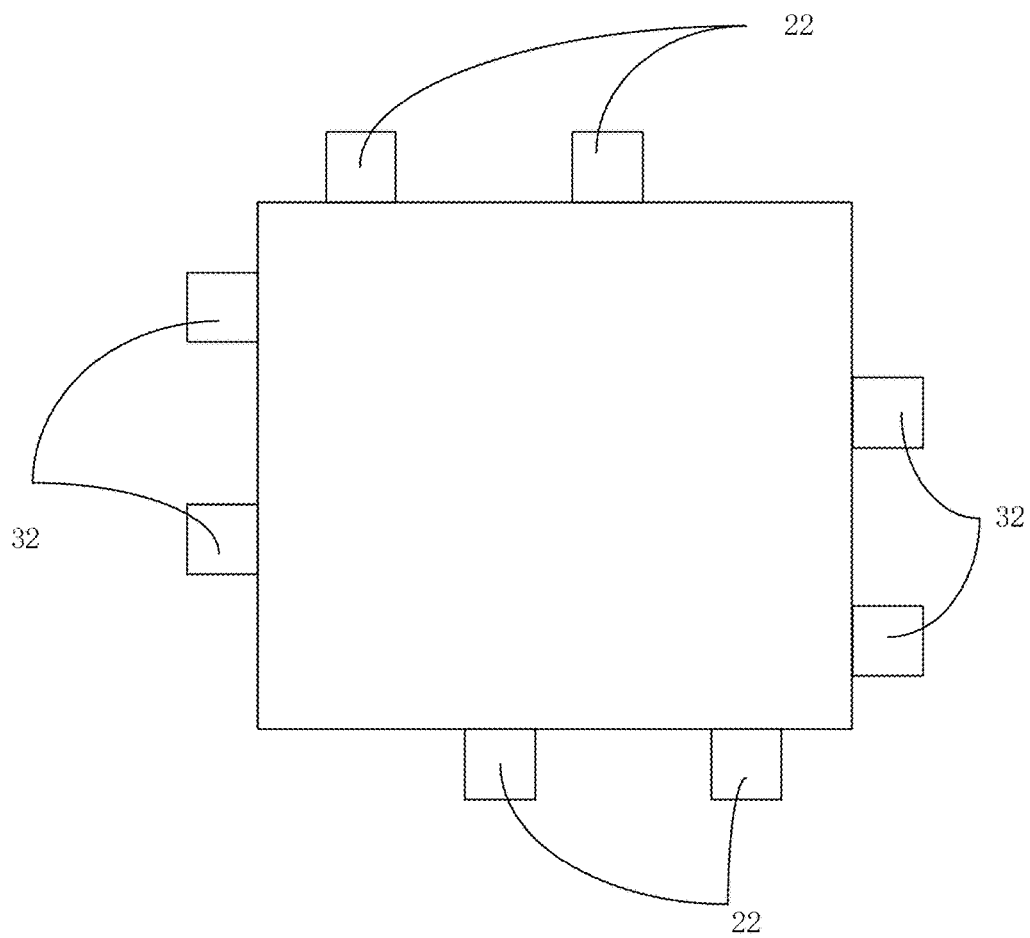
FIG. 9 is a schematic view of arrangement of an exemplary receiving line contacts and emitting electrode line contacts according to an embodiment of the present disclosure.

As shown in FIG. 9, the emitting electrode lines 30 beneath the piezoelectric layer 10 also need to form the contacts, i.e. emitting electrode line contacts 32.

Figure 10:
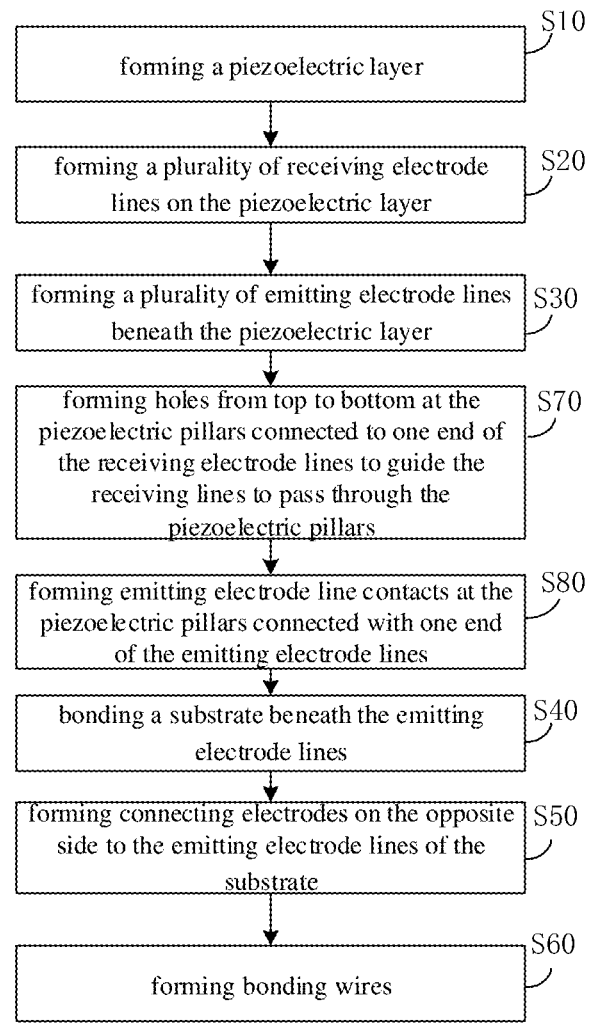
FIG. 10 is a schematic flow chart of an exemplary manufacturing method of an ultrasonic transducer according to another embodiment of the present disclosure.

As shown in FIG. 10, in detail, in some embodiments of the present disclosure, the manufacturing method further comprises:

S80: forming emitting electrode line contacts at the piezoelectric pillars connected with one end of the emitting electrode lines.

Similarly, each emitting electrode line 30 is only need to expose from one side of the piezoelectric pillars, so that either end of the emitting electrode lines can be selected to form the emitting electrode line contacts 32.

Figure 11:
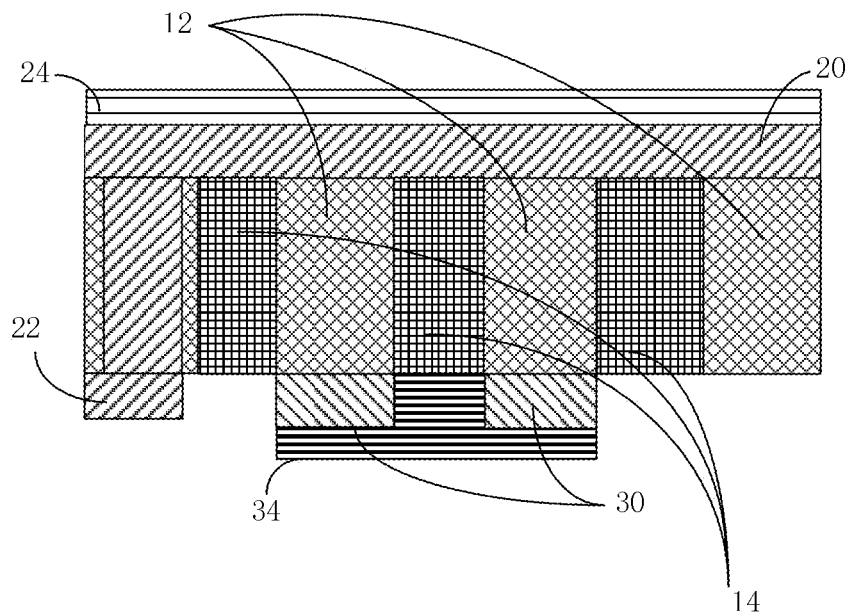
FIG. 11 is a schematic view of an exemplary manufacturing process of an upper protective layer and a lower protective layer to an embodiment of the present disclosure.

As shown in FIG. 11, furthermore, in some embodiments of the present disclosure, the manufacturing method further comprises: forming an upper protective layer being covered the receiving electrode lines 20; and/or forming a lower protective layer being covered the emitting electrode lines 30 in order to protect the receiving electrode lines 20 and the emitting electrode lines 30 which are exposed.

In some embodiments of the present disclosure, the ultrasonic transducer 100 further comprises an upper protective layer 24 and/or a lower protective layer 34. The upper protective layer 24 is configure to cover the receiving electrode lines 20, and the lower protective layer 34 is configure to cover the emitting electrode lines 30.

Such that, the protective layers are configure to protect the lines, further to ensure the electrical performance of the ultrasonic transducer 100.

Preferably, the upper protective layer 24 and the lower protective layer 34 may be made of SU8 material, so as to achieve the effect of insulation and to protect the lines.

It should be noted that, in the following packaging process, the ultrasonic transducer 100 is configured to electrically connected to the corresponding contacts on the circuit, so that the protective layer should be provided to avoid the emitting electrode line contacts 32 and the receiving electrode line contacts 22.

In industrial production, a plurality of the ultrasonic transducer 100 are produced at the same time, such as 1000-2000. The plurality of the ultrasonic transducer 100 may be manufactured on the piezoelectric material at the same time, so as to form a transducer array.

Detailed manufacturing steps refer to the description of the manufacturing method and the structure of the single ultrasonic transducer 100 as described above. The detailed description will be omitted here. In general, a bulk piezoelectric material may be selected and made into a circular piezoelectric wafer having a radial dimension of 8 inches or 12 inches.

Furthermore, in some embodiments of the present disclosure, the manufacturing method further comprises:

forming a dummy wafer on the upper protective layer.

Figure 12:
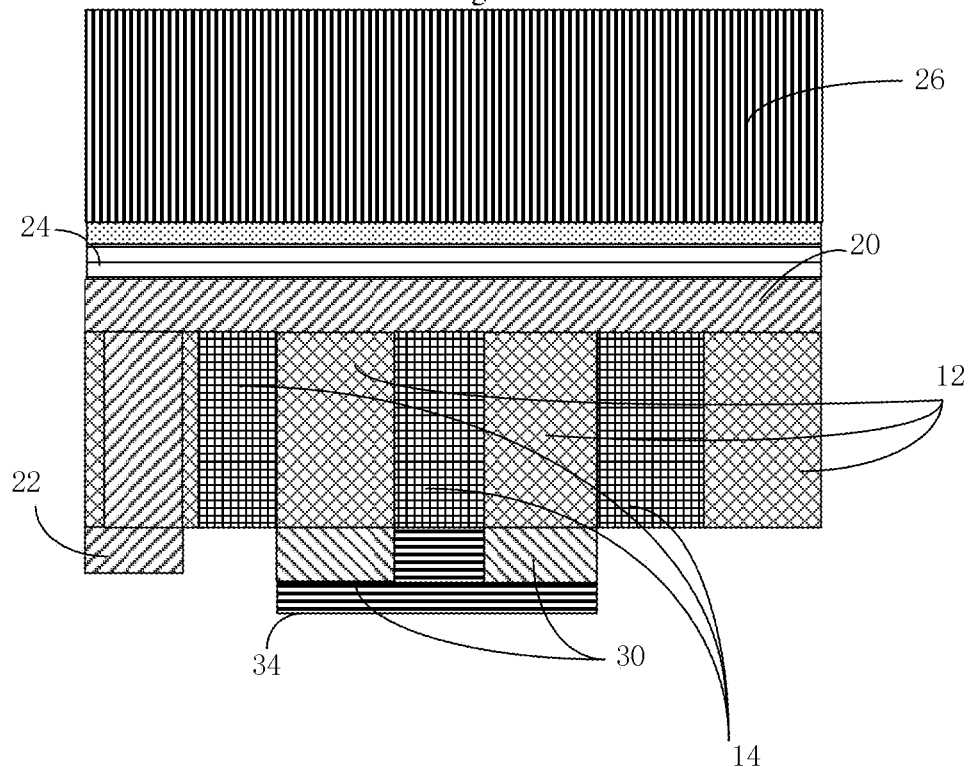
FIG. 12 is a schematic view of an exemplary manufacturing process of a dummy wafer according to an embodiment of the present disclosure.

As shown in FIG. 12, in detail, the dummy wafer 26 may be glass or silicon or the like. The dummy wafer 26 may be viscously connected to the upper protective layer 24 by glue to enhance the overall hardness of the ultrasonic transducer to facilitate the following manufacturing process. In some embodiments, the thickness of the dummy wafer 26 may 6-7 times the thickness of the ultrasonic transducer 100.

Figure 13:
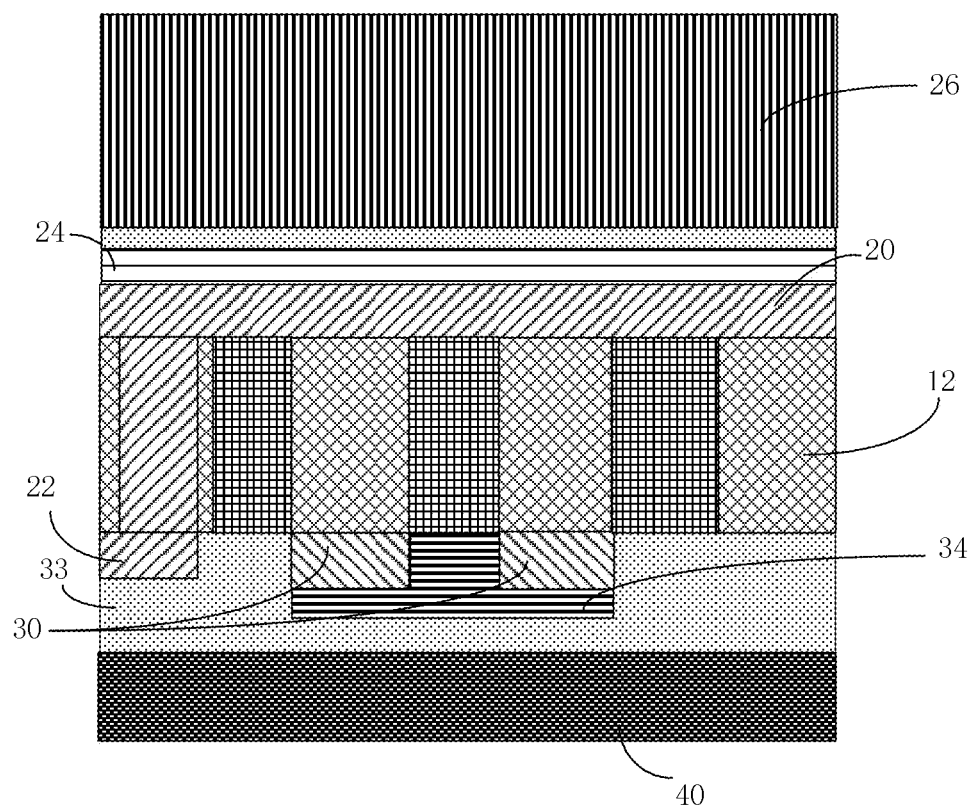
FIG. 13 is a schematic view of an exemplary manufacturing process of a substrate according to an embodiment of the present disclosure.

As shown in FIG. 13, furthermore, for carrying the ultrasonic transducer 100, a substrate 40 is configured to bond to bottom of the emitting electrode lines 30, in other words, to the bottom of the lower protective layer 34.

In some embodiments, the substrate 40 may be glass.

Such that, the substrate 40 may be configured to carry the elements and to support the emitting electrode lines 30, the piezoelectric layer 10 and the receiving lines 20.

In detail, since the receiving electrode line contacts 22, the emitting electrode line contacts 32 and the lower protective layer 34 are formed under the piezoelectric layer, so the bottom of the piezoelectric layer 10 is not flat and needs to be filled by glue 33 and adhere to the substrate 40. The thickness of the glue is 5-10 microns.

The thickness of the substrate 40 may be selected in accordance with overall design requirements, and in some embodiments, the thickness of the substrate may be 100-300 microns.

For instance, in some embodiments, the overall design requirement of the transducer is thinner, the thickness of the substrate may be 100-150 microns, at the same time, taking into account the hardness of the substrate 40 as a carrier, the thickness may thicken to 150-500 microns. In the thickness range of 150-300 microns, the glass has a good carrying capacity.

It should be noted that, unlike the upper protective layer 24 and the lower protective layer 34, the dummy wafer 26 and the substrate 40 need to configure to cover the upper surface and the lower surface of the entire transducer 100 without avoiding the receiving electrode line contacts 22 and the emitting electrode line contacts 32.

Further, for guiding the receiving electrode lines 20 and emitting electrode lines 30 to the bottom of the substrate 40, in other words, guiding the receiving electrode line contacts 22 and the emitting electrode line contacts 32 to the bottom of the substrate 40, a relevant process should be provided under the substrate 40 so that the contacts can be configured to communicate with the circuit board effectively.

Figure 14:
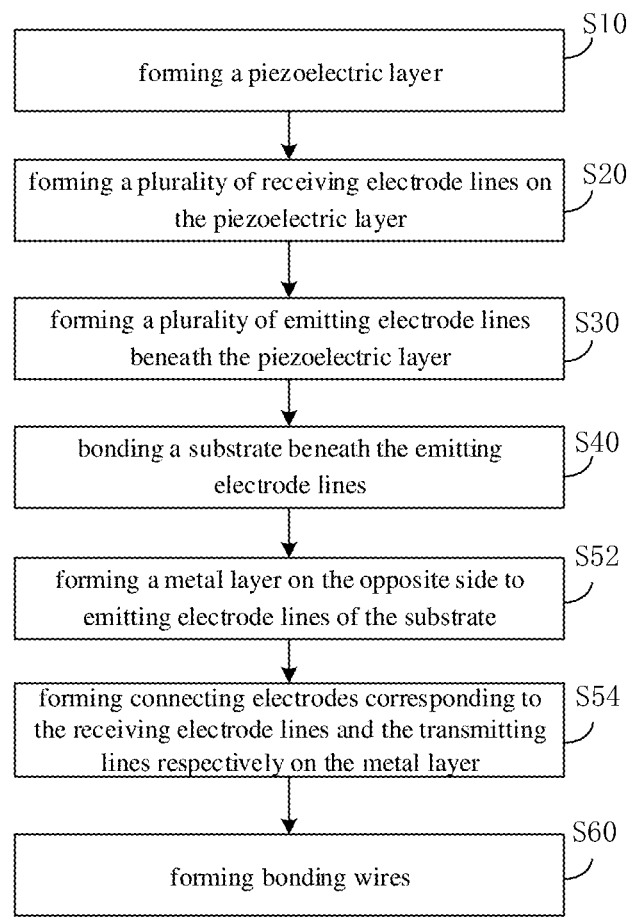
FIG. 14 is a schematic flow chart of an exemplary manufacturing method of an ultrasonic transducer according to another embodiment of the present disclosure.

As shown in FIG. 14, in some embodiments, S50 further comprises:

S52: forming a metal layer on the opposite side to emitting electrode lines of the substrate;

S54: forming connecting electrodes corresponding to the receiving electrode lines and the emitting electrode lines respectively on the metal layer.

Figure 15:
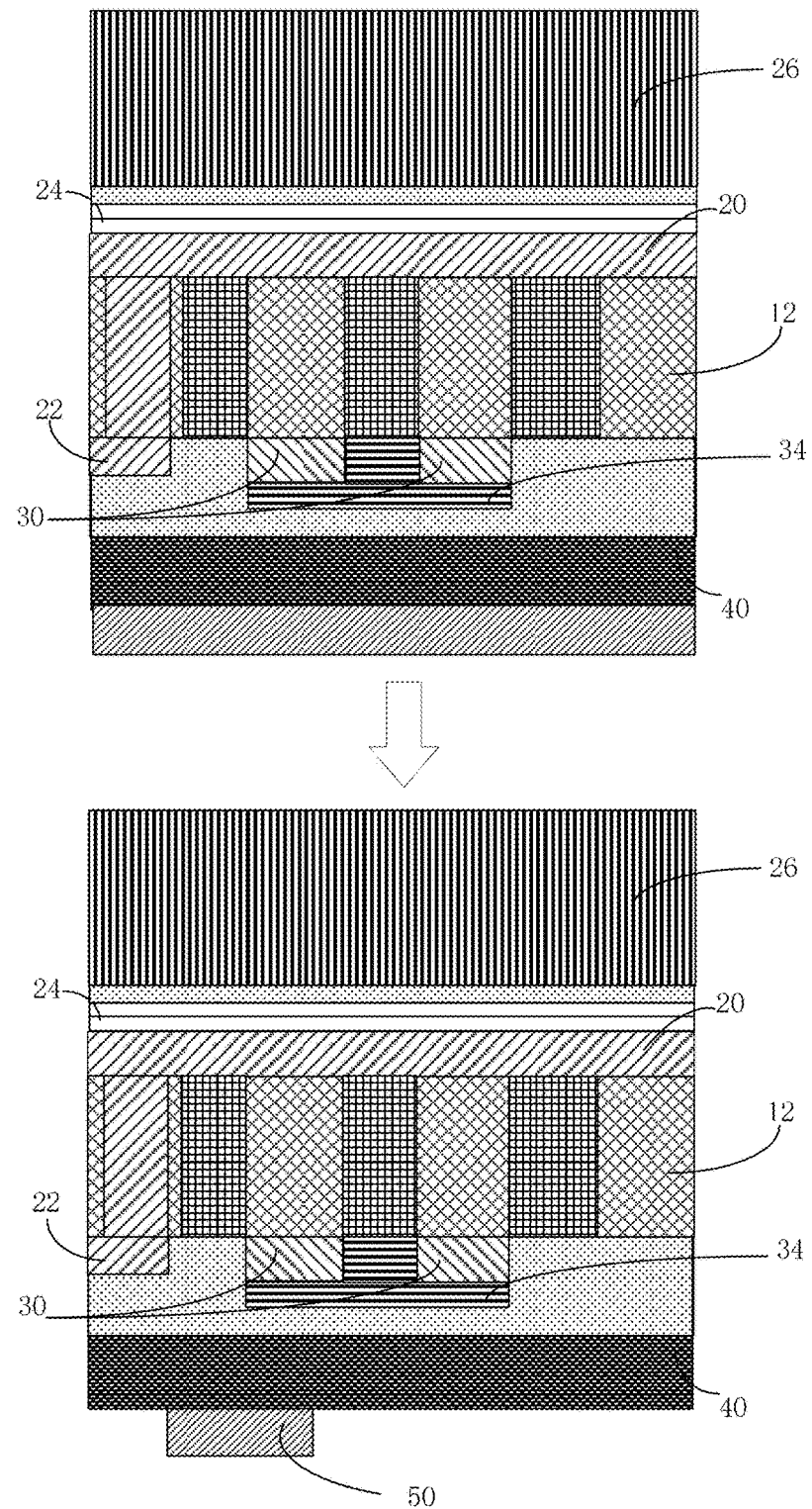
FIG. 15 is a schematic view of an exemplary manufacturing process of connecting electrodes according to an embodiment of the present disclosure.
Figure 16:
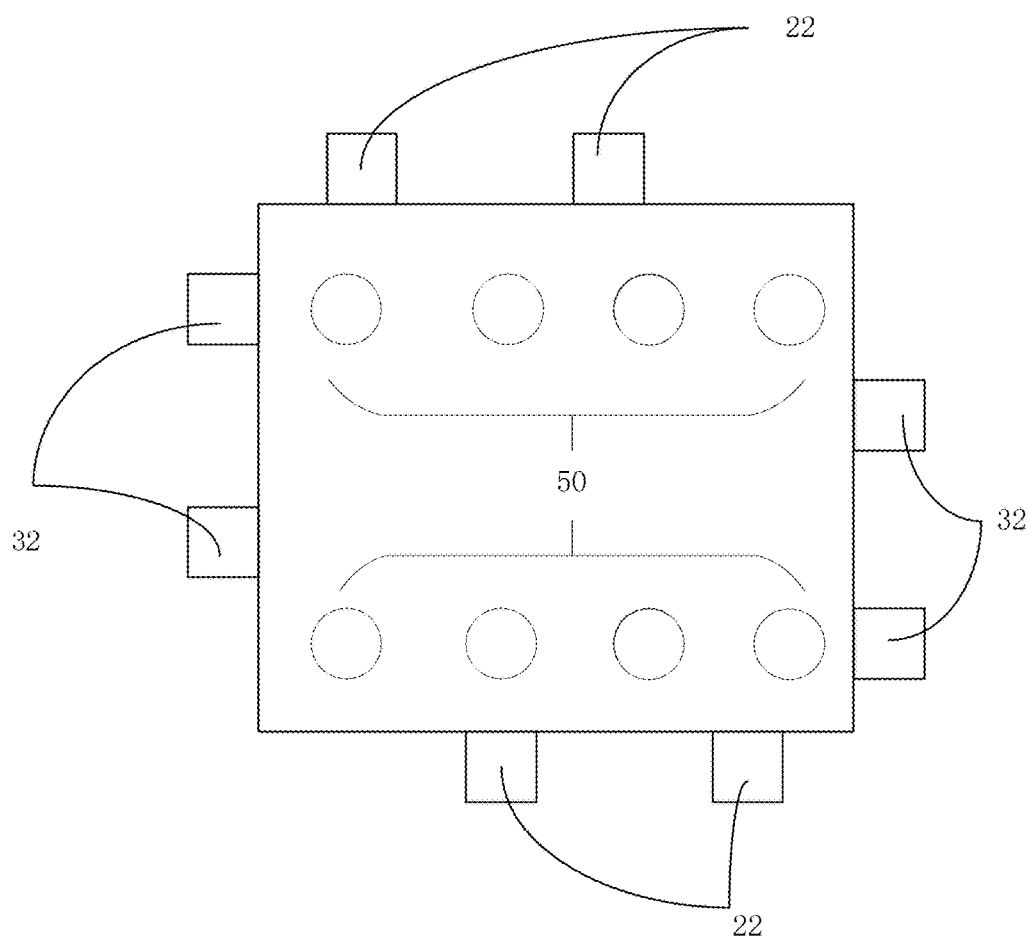
FIG. 16 is a schematic view of arrangement of an exemplary connecting electrodes according to an embodiment of the present disclosure.

As shown in FIG. 15 and FIG. 16, in detail, firstly, a metal layer is plated under the substrate 40, and then forming the connecting electrodes 50 by etching the metal layer, wherein the connecting electrodes 50 has a circular cross section.

Each receiving electrode line contacts 22 and each emitting electrode line contacts 32 corresponds to a connecting electrode 50 respectively, and the connecting electrodes 50 connects to the receiving electrode line contacts 22 and the emitting electrode line contacts 32. Such that, an array of connection electrodes 50 will be formed beneath the substrate 40. The number of the connecting electrodes 50 of one ultrasonic transducer 100 is equal to the sum of the number of the receiving electrode line contacts 22 and the emitting electrode line contacts 32 of the transducer.

Since the receiving line contacts 22 and the emitting electrode line contacts 32 are covered by the substrate 40, for connecting to the connecting electrodes 50, the receiving electrode line contacts 22 and the emitting electrode line contacts 32 should be re-exposed, so that to connect to the connecting electrodes 50 by related process.

Figure 17:
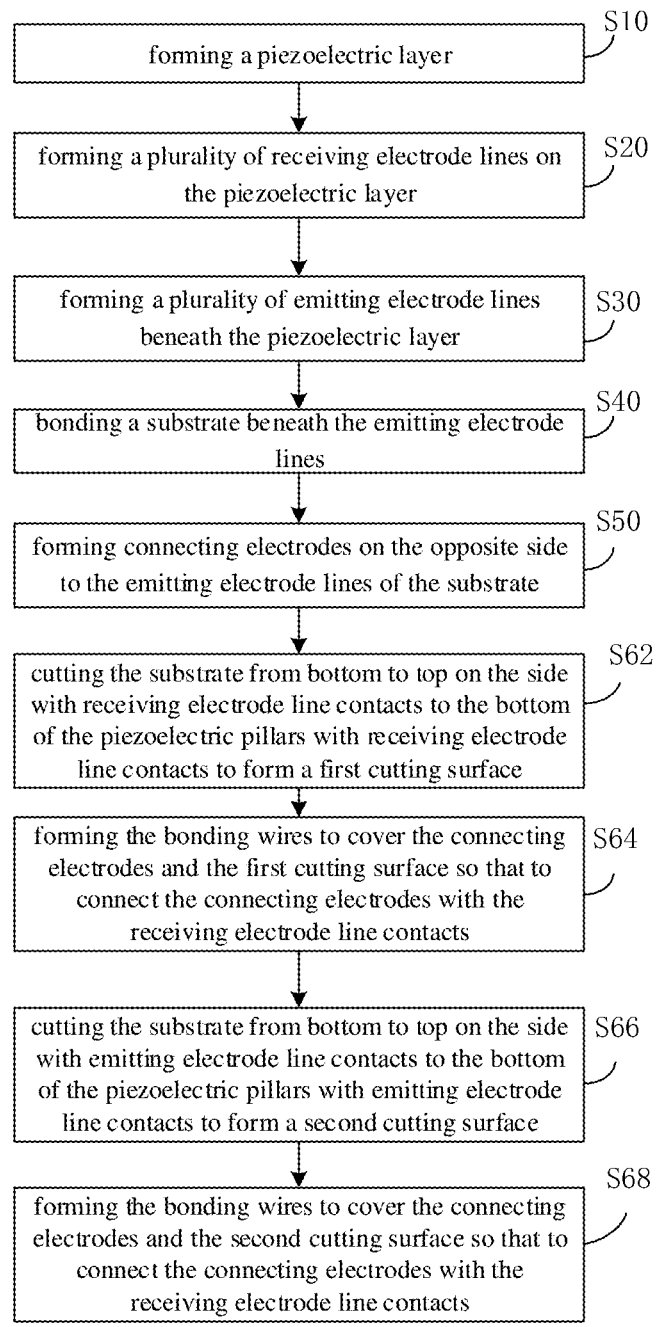
FIG. 17 is a schematic flow chart of an exemplary manufacturing method of an ultrasonic transducer according to another embodiment of the present disclosure.

As shown in FIG. 17, in some embodiments, S60 further comprises:

S62: cutting the substrate from bottom to top on the side with receiving electrode line contacts to the bottom of the piezoelectric pillars with receiving line contacts to form a first cutting surface;

S64: forming the bonding wires to cover the connecting electrodes and the first cutting surface so that to connect the connecting electrodes with the receiving line contacts.

In some embodiments, S60 further comprises:

S66: cutting the substrate from bottom to top on the side with emitting electrode line contacts to the bottom of the piezoelectric pillars with emitting electrode line contacts to form a second cutting surface;

S68: forming the bonding wires to cover the connecting electrodes and the second cutting surface so that to connect the connecting electrodes with the receiving line contacts.

It should be understood that, as described above with respect to the description of the forming of the receiving electrode line contacts 22 and the emitting electrode line contacts 24, the contacts are being formed beneath the piezoelectric pillars 12 around the piezoelectric layer 10. The substrate 40 should be cut in order to make the contacts re-exposed.

Figure 18:
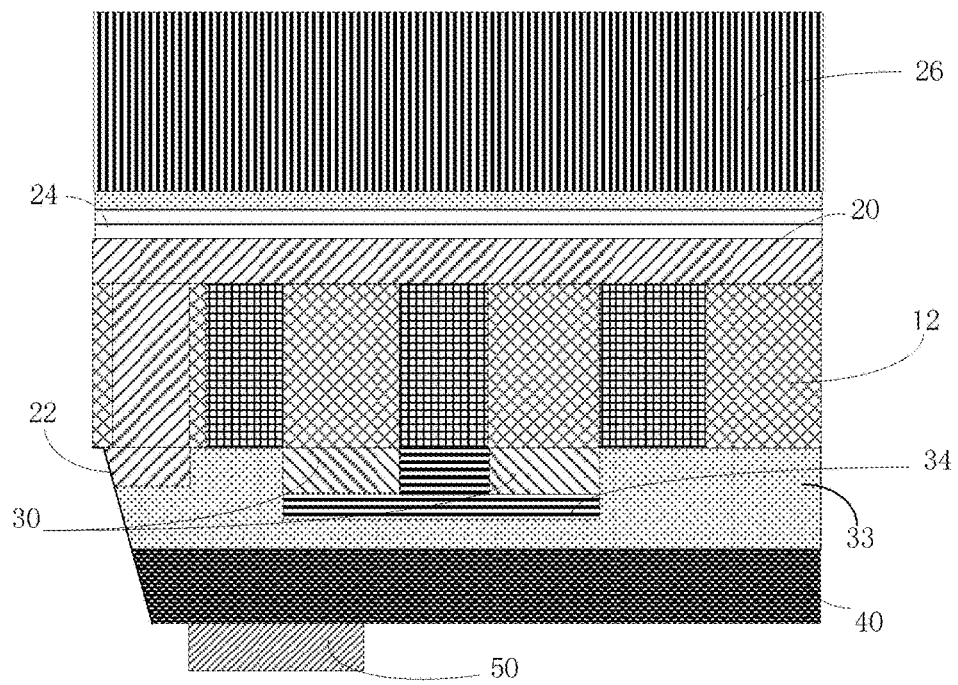
FIG. 18 and FIG. 19 are schematic views of an exemplary of manufacturing process of bonding wires according to an embodiment of the present disclosure.

As shown in FIG. 18, in detail, to the receiving electrode line contacts 22, the substrate 40 may be chamfered from bottom to top on the side with receiving electrode line contacts 22 to the bottom of the piezoelectric pillars 12 with receiving line contacts 22 to form a first cutting surface. Definitely, if the plurality of the receiving electrode line contacts 22 are formed on opposite sides of the piezoelectric layer 10, the two sides should be cut separately.

Similarly, to the emitting electrode line contacts 32, the substrate 40 may be chamfered from bottom to top on the side with emitting electrode line contacts 32 to the bottom of the piezoelectric pillars 12 with emitting electrode line contacts 32 to form a second cutting surface. Definitely, if the plurality of the emitting electrode line contacts 32 are formed on opposite sides of the piezoelectric layer 10, the two sides should be cut separately.

It should be noted that, cutting to the bottom of the piezoelectric pillars 12 so that the contacts can be exposed is enough and should not be cut to the piezoelectric pillars 12 themselves.

Such that, the contacts covered by the substrate 40 are re-exposed and are configured to prepare for connection with the connecting electrodes 50.

Figure 19:
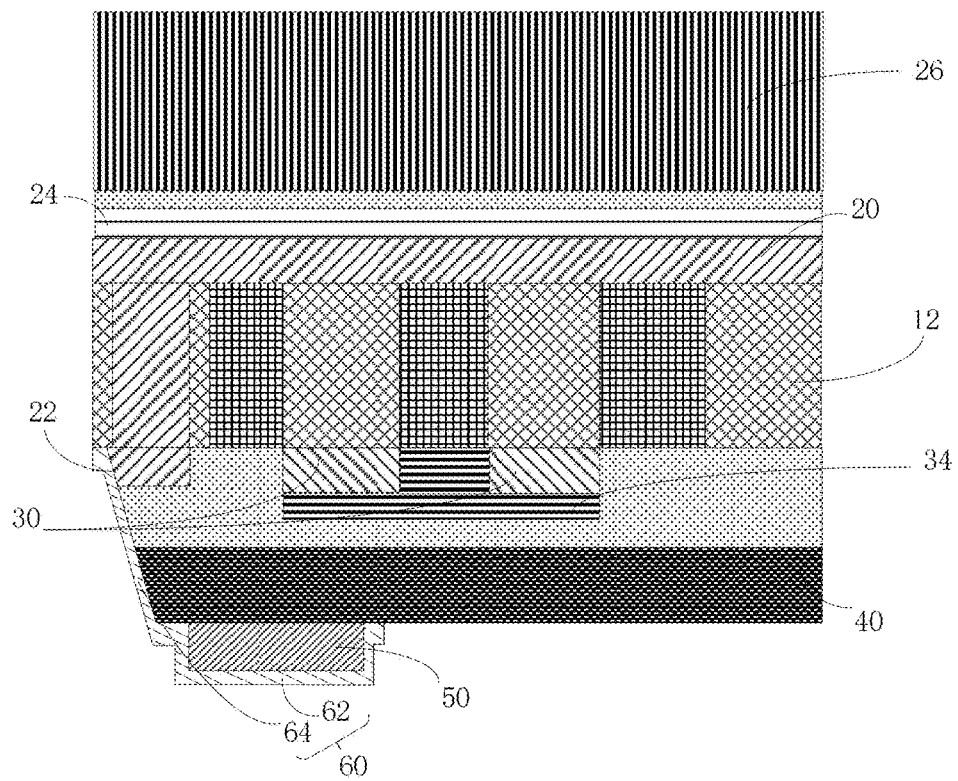

As shown in FIG. 19, further, after the cutting process, the bonding wires 60 are formed by plating or sputtering or the like of a metal to connect to the connecting electrodes 50. In some embodiments, a lead wire 60 comprises a coating section 62 and an interconnecting section 64. The coating section 62 is configured to cover the connecting electrodes 50, and the interconnecting section 64 is configured to connect to the coating section 62 and to cover the cutting surface and the contacts. In the manufacturing process, the coating section 62 and the interconnecting section 64 are formed at one time.

Such that, the bonding wires are configured to connect the connecting electrodes 50 with the contacts.

Preferably, the bonding wires 60 may be gold, silver or nickel.

Figure 20:
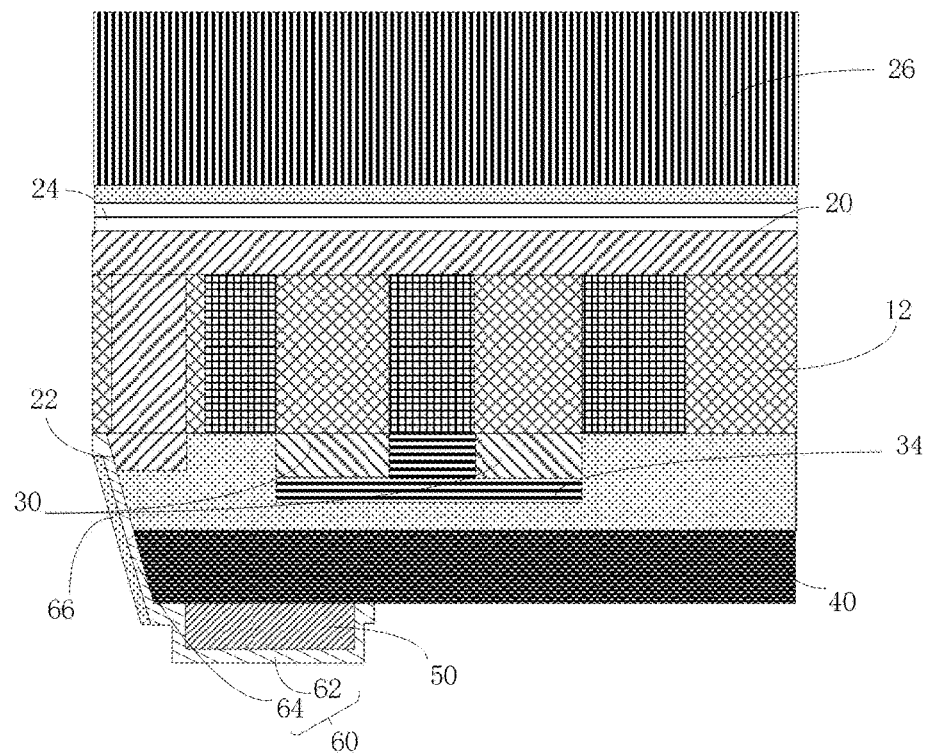
FIG. 20 is a schematic view of an exemplary of manufacturing process of a protective layer according to an embodiment of the present disclosure.

As shown in FIG. 20, further, the bonding wires 60 are still in an exposed state, and therefore, the exposed bonding wires 60 should be coating a protective layer 66.

It should be noted that, when the protective layer 66 is coated, the exposed portion of the entire bonding wires 60 is covered, while the coating sections 62 which cover the connecting electrodes 50 are further configured to connect to the circuit board, so that the protective layer 66 should be processed.

In detail, the photoresist may be coated at the coating sections 62, and the coating sections 62 may be re-exposed by exposing at the coating portion.

Figure 21:
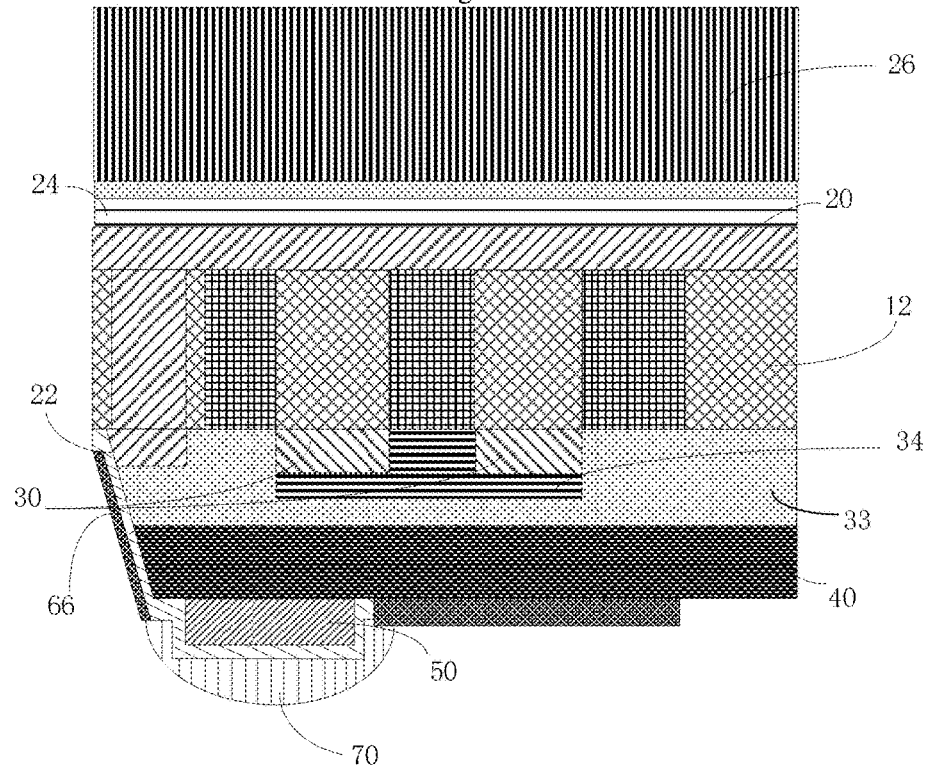
FIG. 21 is a schematic view of an exemplary of manufacturing process of solder balls according to an embodiment of the present disclosure.

As shown in FIG. 21, further, in order to facilitate the connection of the transducer with the circuit board, in some embodiments, the manufacturing method comprises:

implanting solder balls at the coating sections.

In some embodiments, the ultrasonic transducer 100 further comprises solder balls 70, the solder balls 70 are configured to cover the coating sections 62.

Such that, the solder balls can be configured to form a welding point, to facilitate welding with the circuit board. The solder balls 70 are formed by the process of placing tin at the coating sections 62, and being subject to high temperature and cooling treatment.

Figure 22:
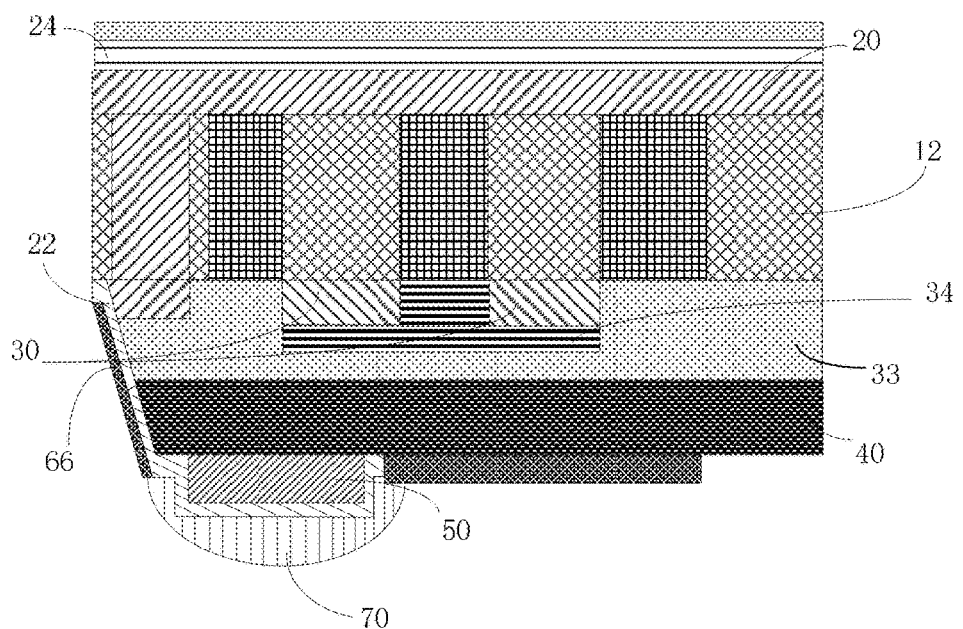
FIG. 22 is a schematic cross view of an exemplary of an ultrasonic transducer package according to an embodiment of the present disclosure.
Figure 23:
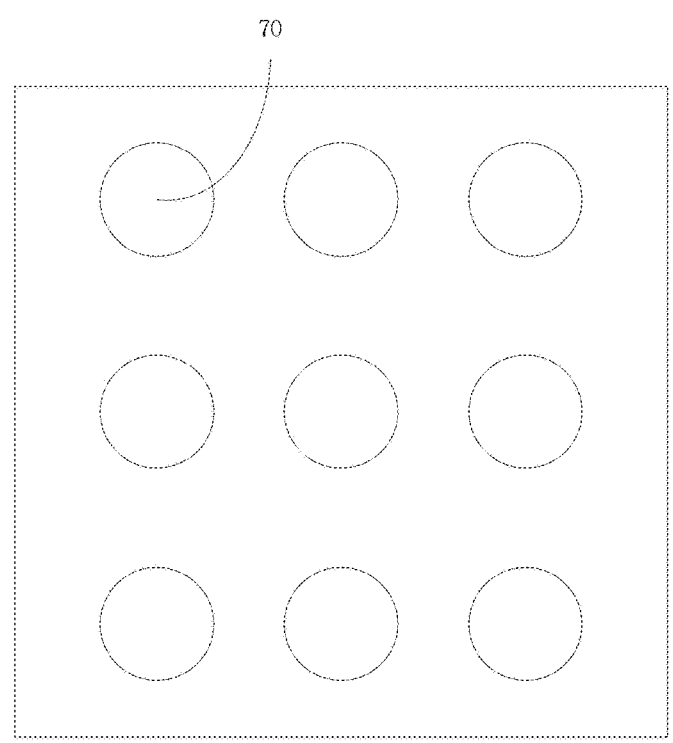
FIG. 23 is a schematic view of arrangement of an exemplary of solder balls according to an embodiment of the present disclosure.

As shown in FIGS. 22 and 23, at this point, the manufacturing process of the ultrasonic transducer 100 is substantially complete, and the manufacturing method further comprises: removing the dummy wafer 26 and removing the glues for adhesion to the protective layer 24 and the dummy wafer 26.

Further, cutting the ultrasonic transducer array into a single ultrasonic transducer 100, such that, forming a Ball Grid Array (BGA) package of a single ultrasonic transducer 100.

Figure 24:
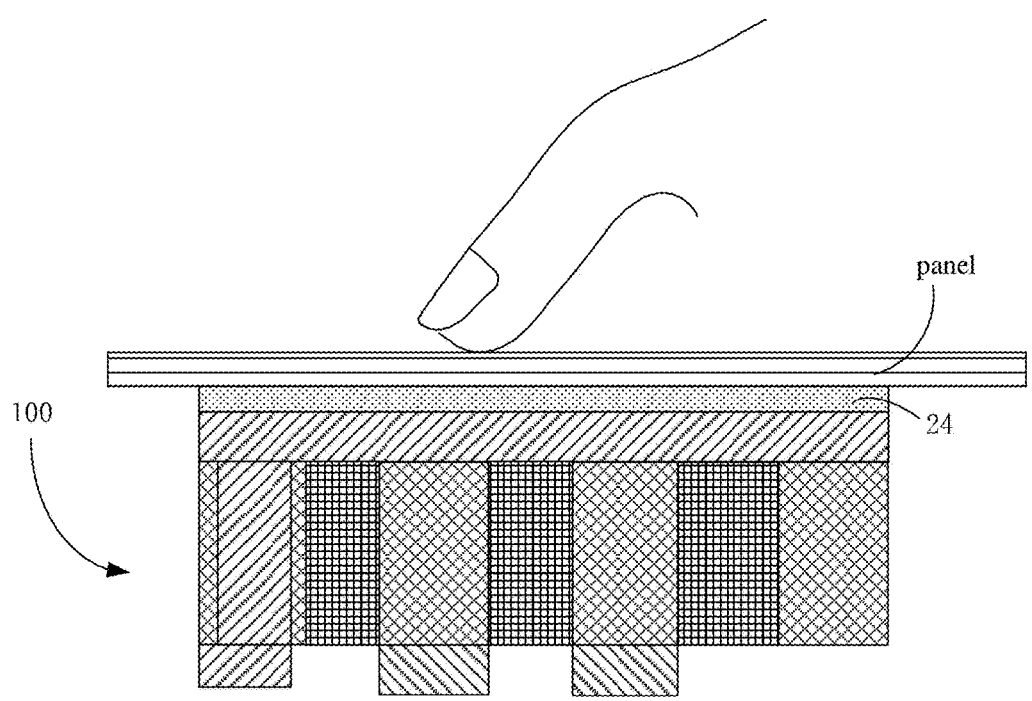
FIG. 24 is a schematic view of application of an exemplary of an ultrasonic transducer according to an embodiment of the present disclosure.

As shown in FIG. 24, after the single ultrasonic transducer 100 is manufactured, bonding the ultrasonic transducer 100 to the panel of an electronic device which it is applied via the upper protective layer 24, wherein the device comprises a mobile phone or a tablet, in detail, the ultrasonic transducer 100 is configured to bond to the bottom of the panel.

In view of the above, the BGA package of a single ultrasonic transducer 100 can be formed by the manufacturing process which is described above. The entire substrate 40 can be configured to form the connecting electrode 50 and to connect to the contacts of the circuit board via the bonding wires 60 by guiding the contacts of lines around the piezoelectric layer 10 to the bottom of the substrate 40, so that to achieve the redistribution of the lines, it can be understood that the pitches available for the contacts of lines will be significantly larger than the case which the contacts around the piezoelectric layer 10 connect to the circuit board directly after the redistribution of lines. For the case that the pitches between the contacts is tight, it is possible to set the position of the connecting electrodes to connect with the contacts flexibly, thereby effectively improving the problems that the pitches between the contacts is tight and circuit board is difficult to connect. In addition, since the process is carried out under the piezoelectric layer 10, so the width dimension of the ultrasonic transducer 100 does not increase significantly.

In this present disclosure, unless indicated otherwise, a structure in which a first feature is "on" or "underneath" a second feature may include an embodiment in which the first feature directly contacts the second feature and may include an embodiment in which an additional feature is prepared between the first feature and the second feature so that the first feature does not directly contact the second feature. Furthermore, a structure in which a first feature is "on" or "above" a second feature may include an embodiment in which the first feature is right above or inclined above the second feature and may include an embodiment in which the first feature is higher than the second feature. A structure in which a first feature is "under" or "below" a second feature may include an embodiment in which the first feature is right under or inclined under the second feature and may include an embodiment in which the first feature is lower than the second feature.

Reference throughout this specification to "an embodiment," "some embodiments," "an illustrated embodiment", "an example," "a specific example," or "some examples," means that a particular feature, structure, material, or characteristic described in connection with the embodiment or example is included in at least one embodiment or example of the present disclosure. The schematic expressions of the above-mentioned phrases throughout this specification are not necessarily referring to the same embodiment or example of the present disclosure. Furthermore, the particular features, structures, materials, or characteristics can be combined in any suitable manner in any one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. An ultrasonic transducer for an ultrasonic finger print sensor comprising:
   a piezoelectric layer, wherein the piezoelectric layer comprises an array of piezoelectric pillars;
   a plurality of receiving electrode lines being formed on the piezoelectric layer, wherein each of the receiving electrode lines is configured to connect to a corresponding column of the piezoelectric pillars;
   a plurality of emitting electrode lines being formed beneath the piezoelectric layer, wherein each of the emitting electrode lines is configured to connect to a corresponding row of the piezoelectric pillars;
   a substrate, wherein the substrate is configured to carry the receiving electrode lines, the piezoelectric layer and the emitting electrode lines;
   a plurality of connecting electrodes, wherein the connecting electrodes are formed on the substrate, opposite to the emitting electrode lines;
   a plurality of bonding wires, wherein the bonding wires are configured to connect the receiving electrode lines with the connecting electrodes and to connect the emitting electrode lines with the connecting electrodes;
   a plurality of emitting electrode line contacts formed at the piezoelectric pillars connected with one end of the emitting electrode lines; and
   a cutting surface formed by cutting the substrate from bottom to top on a side with emitting electrode line contacts to the bottom of the piezoelectric pillars with emitting electrode line contacts;
   wherein the bonding wires cover the connecting electrodes and the cutting surface to connect the connecting electrodes with the emitting electrode line contacts.

2. The ultrasonic transducer of claim 1, wherein the piezoelectric layer further comprises fillers, wherein the fillers are configured to fill gaps formed between the plurality of the piezoelectric pillars.

3. The ultrasonic transducer of claim 2, wherein the fillers comp rise epoxy glues.

4. The ultrasonic transducer of claim 1, wherein each of the piezoelectric pillars has a rectangular cross-section with a width of about 30 microns and a height of about 70-80 microns.

5. The ultrasonic transducer of claim 1, wherein the receiving electrode lines have a thickness of about 2.5 microns and/or the emitting electrode lines have a thickness of about 2. 5 microns.

6. The ultrasonic transducer of claim 1, wherein the substrate comprises glass.

7. The ultrasonic transducer of claim 1, wherein the substrate has a thickness of about 100-300 microns.

8. The ultrasonic transducer of claim 1, wherein the ultrasonic transducer further comprises at least one of the following parts:
an upper protective layer, wherein the upper protective layer is configured to cover the piezoelectric layer and the receiving electrode lines; and
a lower protective layer, wherein the lower protective layer is configured to cover the emitting electrode lines and to bond to the substrate.

9. The ultrasonic transducer of claim 1, wherein the bonding wires comprise:
coating sections, wherein the coating sections are configured to cover the connecting electrodes; and
interconnecting sections, wherein the interconnecting sections are configured to connect the coating sections with the receiving electrode lines and to connect the coating sections with the emitting electrode lines.

10. The ultrasonic transducer of claim 9, wherein the ultrasonic transducer further comprises at least one of the following parts:
a protective layer, wherein the protective layer is configured to cover the interconnecting sections; and
solder balls, wherein the solder balls are configured to cover the coating sections.

11. A manufacturing method of an ultrasonic transducer of an ultrasonic fingerprint sensor, comprising:
forming a piezoelectric layer, wherein the piezoelectric layer comprises an array of piezoelectric pillars;
forming a plurality of receiving electrode lines on the piezoelectric layer, wherein each of the receiving electrode lines is configured to connect to a corresponding column of the piezoelectric pillars;
forming a plurality of emitting electrode lines beneath the piezoelectric layer, wherein each of the emitting electrode lines is configured to connect to a corresponding row of the piezoelectric pillars;
bonding a substrate beneath the emitting electrode lines;
forming connecting electrodes on the substrate, opposite to the emitting electrode lines;
forming bonding wires to connect the receiving electrode lines with the connecting electrodes and to connect the emitting electrode lines with the connecting electrodes; and
forming emitting electrode line contacts at the piezoelectric pillars connected with one end of the emitting electrode lines;
wherein the step of forming the bonding wires to connect the receiving electrode lines with the connecting electrodes and to connect the emitting electrode lines with the connecting electrodes further comprises:
cutting the substrate from bottom to top on a side with emitting electrode line contacts to the bottom of the piezoelectric pillars with emitting electrode line contacts to form a first cutting surface; and
forming the bonding wires to cover the connecting electrodes and the first cutting surface to connect the connecting electrodes with the emitting electrode line contacts.

12. The manufacturing method of claim 11, wherein the manufacturing method further comprises one of the following steps:
forming an upper protective layer to cover the receiving electrode lines; and
forming a lower protective layer to cover the emitting electrode lines, wherein the lower protective layer is configured to bond to the substrate.

13. The manufacturing method of claim 11, wherein the step of forming the connecting electrodes on the opposite side to the emitting electrode lines of the substrate further comprises:
forming a metal layer on the opposite side to the emitting electrode lines of the substrate; and
forming the connecting electrodes corresponding to the receiving electrode lines and the emitting electrode lines respectively on the metal layer.

14. The manufacturing method of claim 11, wherein the manufacturing method further comprises:
forming holes from top to bottom at the piezoelectric pillars connected to one end of the receiving electrode lines to guide the receiving electrode lines to pass through the piezoelectric pillars and forming receiving electrode line contacts beneath the piezoelectric pillars.

15. The manufacturing method of claim 14, wherein the step of forming the bonding wires to connect the receiving electrode lines with the connecting electrodes and to connect the emitting electrode lines with the connecting electrodes further comprises:
cutting the substrate from bottom to top on a side with receiving electrode line contacts to the bottom of the piezoelectric pillars with receiving electrode line contacts to form a second cutting surface; and
forming the bonding wires to cover the connecting electrodes and the second cutting surface to connect the connecting electrodes with the receiving electrode line contacts.

* * * * *